United States Patent [19]
Ogawa

[11] 3,804,513
[45] Apr. 16, 1974

[54] DEVICE FOR ILLUMINATION IN A COPYING MACHINE

[75] Inventor: Masaya Ogawa, Osaka, Japan

[73] Assignee: Minolta Camera Kabushiki Kaisha, Osaka, Japan

[22] Filed: Mar. 23, 1972

[21] Appl. No.: 237,586

Related U.S. Application Data
[63] Continuation of Ser. No. 877,735, Nov. 18, 1969, abandoned.

[30] Foreign Application Priority Data
Nov. 19, 1968 Japan.............................. 43-84669

[52] U.S. Cl..................................... 355/67, 355/70
[51] Int. Cl. ......................................... G03b 27/54
[58] Field of Search............................... 355/67, 70

[56] References Cited
UNITED STATES PATENTS
3,272,067  9/1966  White.................................. 355/70
3,428,397  2/1969  Elmer................................ 355/70 X
3,312,143  4/1967  Karow............................... 355/71 X

*Primary Examiner*—Monroe H. Hayes
*Attorney, Agent, or Firm*—Wolder & Gross

[57] ABSTRACT

A device for illuminating an original in a copying machine, comprising one or more planar reflectors disposed in the proximity of edges of an original-holding glass plate of the copying machine. One or more light sources, each corresponding to one of the planar reflectors, are disposed on the opposite side of the corresponding planar reflector with respect to the glass plate. Reflective shades, each corresponding to one of the light sources, are disposed at the back of the corresponding light sources, respectively, to direct light beams to the corresponding planar reflector in such a manner that the reflected light beams from the reflectors become incident to the original. The reflective shades are so shaped and disposed that they interrupt both light beams directly proceeding to the photosensitive copying paper and light beams producing a ghost image.

2 Claims, 6 Drawing Figures

PATENTED APR 16 1974          3,804,513

INVENTOR.
MASAYA OGAWA
BY Stanley Wolder

INVENTOR.
MASAYA OGAWA
BY Stanley Wolder

DEVICE FOR ILLUMINATION IN A COPYING MACHINE

This is a continuation of application Ser. No. 877,735 filed Nov. 18, 1969, now abandoned.

This invention relates to an illuminating device for a copying machine, and more particularly to such illuminating device for the so-called full-exposure type copying machine, in which the full image of an original to be copied is projected on a sheet of photosensitive copying paper.

The present invention relates to an illuminating device to be used in a copying machine having an original-holding glass plate, of which upper surface receives an original being copied, characterized in that a planar reflector is disposed in the proximity of one edge of the original-holding glass plate so as to extend downward substantially at right angles to the original-holding glass plate, and a combination of a light source and a reflective shade is disposed below the original-holding plate on the opposite side of the planar reflector with respect to the original-holding plate, said reflective shade directing light beams from the light source to the planar reflector in such a manner that the reflected light beams from the reflector become incident to the original for producing image-carrying light beams toward a photosensitive copying paper, said reflective shade being so disposed that the shade interrupts both light beams directly proceeding from the light source to the photosensitive copying paper and light beams producing a ghost image upon reflection from the original-holding glass plate.

An object of the present invention is to provide an improved illuminating device for a copying machine, which comprises a planar reflector disposed in the proximity of one edge of an original-holding glass plate of the copying machine substantially at right angles to the glass plate so as to face a light source of the copying machine, and a reflective shade of special configuration for reflecting light beams from the light source, so that the light source and the reflective shade can be mounted within a small space, for instance, in a space smaller than that of an original to be copied, whereby the illuminating device can be assembled in a compact form, while ensuring a high illuminating efficiency.

Another object of the present invention is to provide an illuminating device for a copying machine, which comprises a planar reflector having an aventurine surface for producing major reflected light beams mixed with scattered light beams, whereby the so-called auxiliary exposing effects of producing soft-toned copies of an original can be readily achieved without necessitating any separate auxiliary lighting means.

Another object of the present invention is to provide an illuminating device for a copying machine, in which a light source is disposed in the proximity of a projecting lens on a common holder, so that as the magnification of the copying machine varies, the light source move together with the projecting lens for changing the distance between the projecting lens and an original being copied, whereby the brightness of the original, or quantity of light reflected from each unit area of the original, can be adjusted with the variation of the magnification, without necessitating any separate means for adjusting the quantity of light, such as a means varying an aperture for the projecting lens and a means varying power source voltage of the light source.

Other objects and a fuller understanding of the present invention would be appreciated by referring to the following description, taken in conjunction with the accompanying drawings, in which.

Like parts are designated by like numerals throughout the drawings.

Figure 1:
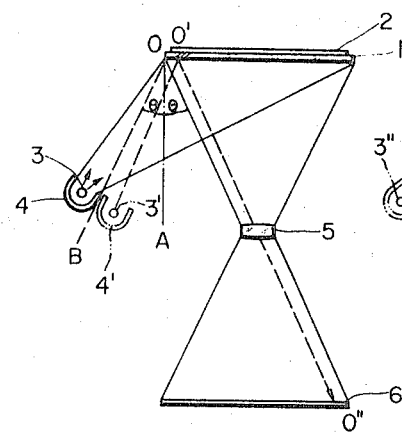
FIG. 1 is a schematic diagram, illustrating the construction of a known illuminating device for a copying machine.

In a known illuminating device for a copying machine, as depicted in FIG. 1, an original 2 which is to be copied is placed on the upper surface of an original-holding glass plate 1, while facing the original downward. A combination, consisting of a light source 3 and a reflective shade 4 disposed at the back of the light source, directs light beams to the original for illumination. In other words, the reflective shade 4 has such a directivity that the light beams from the light source 3 are reflected toward the original. A projecting lens 5 produces an image of the original 2 on a photosensitive copying paper 6, by focussing the light beams reflected from the original 2. In order to avoid the so-called ghost image, the position of the combination of the light source 3 and the reflective shade 4 is to be specified, relative to the glass plate 1 and the projecting lens 5. If a vertical to the glass plate 1 at the left-hand edge O (as seen in FIG. 1) is represented by $\overline{OA}$ and the angle between the vertical $\overline{OA}$ and a line $\overline{OL}$ from the edge O to the left-hand edge L (as seen in FIG. 1) of the projecting lens 5 is represented by O, the assembly of the light source 3 and the reflective shade 4 should be on the opposite side of the vertical $\overline{OA}$ to the projecting lens 5 and the angle between the vertical $\overline{OA}$ and a line $\overline{OB}$ from the edge O of the glass plate 1 to the right-hand edge B (as seen in FIG. 1) of the shade 4 should be larger than O. If the combination of the light source 3 and the reflective shade 4 should be located so close to the projecting lens 5 that the angle $\angle BOA$ becomes smaller than 0, for instance at positions 3' and 4' in FIG. 1, light beams reflected from the lower surface of the original-holding glass plate 1, e.g., from a point O', produces a ghost image on the photosensitive copying paper 6, e.g., at a point O'', after passing through the projecting lens 5. Accordingly, with the light source located too close to the projecting lens 5, the true image of the original 2 is disturbed by the ghost image.

The aforesaid restriction of the position of the assembly of the light source 3 and the reflective shade 4 causes the illuminating device to become large or bulky in size. Especially, if a large glass plate 1 should be used for holding a larger original, or if a plurality of light sources 3 should be provided for effecting uniform illumination of an original, the illuminating device is to occupy an unreasonably large space in the copying machine, as compared with the size of originals to be copied thereby. Sometimes, the cooling of the light source 3 becomes very difficult due to such restrictions.

The known illuminating device has a further shortcoming in that if it is mounted on the copying machine with a varying magnification, e.g., 0.7, 1.0, 1.3, etc., the light source 3 can not move when the projecting lens 5 moves for varying the magnification. If provision is made in the known illuminating device for the movement of the light source 3 with the projecting lens 5, the copying machine becomes further bulkier. In order to ensure constant brightness of the original or constant quantity of light reflected from the unit area of the original, for different magnifications, an additional means is necessary, such as a means for controlling the exposure time and a means for controlling an aperture for the projecting lens, in the case of known illuminating devices.

The present invention intends to mitigate the aforesaid difficulties by providing an improved illuminating device which not only obviates such difficulties but also presents additional advantages and convenience to the operation of the copying machine.

Figure 2:
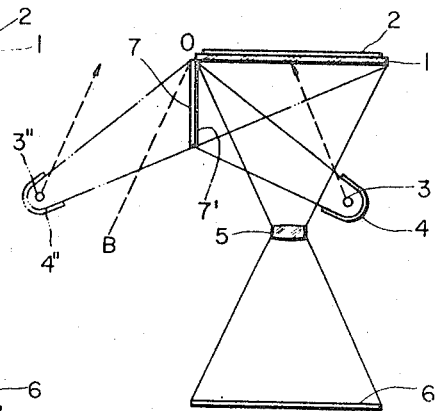
FIGS. 2 to 4 are diagrammatic illustrations, showing the construction of various embodiments of the present invention, respectively.
Figure 3:
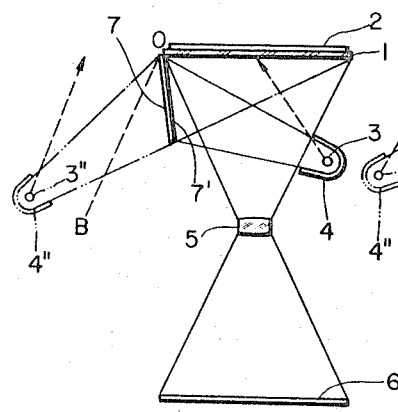
Figure 4:
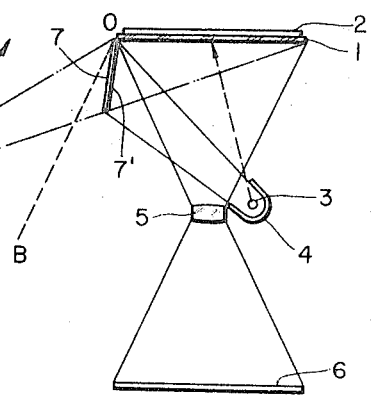

Referring to FIGS. 2 to 4, a planar reflector 7 with a reflective face 7' is disposed at one edge O of an original-carrying glass plate 1, so as to extend downward (as seen in the figures) from the edge O substantially at right angles to the glass plate 1. A light source 3 is disposed on the opposite side of the reflector 7 with respect to a projecting lens 5, and a reflective shade 4 is disposed immediately at the back of the light source 3, so as to direct light beams to the reflector 7, which in turn reflects the light beams to an original 2 placed on the glass plate 1. The reflective shade 4 is so shaped as to interrupt light beams directly reaching a photosensitive copying paper 6 through the projecting lens 5 and also light beams liable to generate a ghost image. The projecting lens 5, of course, projects the image of the original 2 being copied, by focussing light beams reflected therefrom. In the embodiment of FIG. 2, the angle between the reflector 7 and the glass plate 1 is exactly 90°. On the other hand, in the embodiments of FIGS. 3 and 4, the corresponding angles are slightly smaller and larger than 90°, respectively.

In the embodiments of the invention, as illustrated in FIGS. 2 to 4, the planar reflector 7 produces virtual images 3' and 4' of the light source 3 and the reflective shade 4, respectively. If a virtual image of a line from the edge O of the glass plate 1 to the left-hand edge of the projecting lens 5 (as seen in FIGS. 2 to 4), which is produced by the vertical reflective face 7' of FIG. 2, is represented by $\overline{OB}$, the virtual images 3'' and 4'' of the light source and the shade are located farther away from the glass plate 1 than the line $\overline{OB}$. As a result, there will be produced no ghost image, despite that the light source 3 and the projecting lens 5 are disposed on the same side of the vertical to the glass plate 1 at the edge O.

With the aforesaid arrangement of the invention, there are such light beams from the light source 3, which directly become incident to the glass plate 1 without being neither reflected by the reflector 7 nor interrupted by the shade 4. It is apparent that such directly incident light beams never produce any ghost image, judging from the incident angles of the light beams to the glass plate 1. In the illustrated embodiments, such directly incident light beams illuminate about one half of the original 2 being copied. In other words, some of the light beams in known illuminating devices, which have been wasted without illuminating the original 2, can be effectively utilized in the device of the invention for illumination of the original.

Furthermore, with the device of the present invention, the position of the light source 3, the shade 4, and the planar reflector 7 can be modified within a considerably wide range, provided that the aforesaid virtual images 3'' and 4'' fall outside of the aforesaid line $\overline{OB}$ with respect to the projecting lens 5. For instance, the planar reflector 7 can be spaced from one edge of the original-holding glass plate 1.

Figure 5:
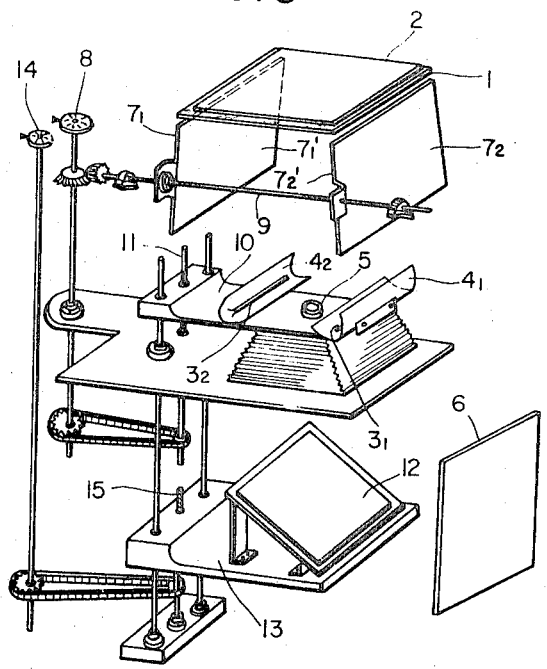
FIG. 5 is a perspective view of an illuminating device for a copying machine, embodying the present invention.

FIG. 5 illustrates a practical illuminating device with a pair of optical systems, according to the present invention. In the figure, a pair of planar reflectors $7_1$ and $7_2$ are disposed in the proximity of the opposing edges of an original-holding glass plate 1, each having a reflecting face $7_1'$ or $7_2'$, which defines an angle slightly larger than 90° with respect to the glass plate 1. A mechanism with a dial 8 is provided for varying the magnifying power, or magnification, of the copying machine equipped with the device of the invention. The planar reflectors $7_1$ and $7_2$ are interconnected with each other by a reflector shaft 9, which is disposed in parallel with the glass plate 1. The reflector shaft 9 is also operatively connected to the dial 8, so as to rotate in response to the dial 8. The reflectors $7_1$ and $7_2$ are connected to the reflector shaft 9 by oppositely directed threads, respectively, so as to move in response to any change of the magnifying power. For instance, as the magnifying power of the copying machine increases, the reflectors $7_1$ and $7_2$ moves toward each other, or inwardly with respect to the glass plate 1, while as the magnifying power decreases, the reflectors $7_1$ and $7_2$ move away from each other, or outwardly with respect to the glass plate 1. Tubular light sources $3_1$ and $3_2$ are operatively associated with trough-like reflective shades $4_1$ and $4_2$, respectively. The light sources $3_1$, $3_2$ and the reflective shades $4_1$, $4_2$ are secured to a lens holder 10 carrying a projecting lens 5 by a suitable means, e.g., by bolting. The lens holder 10 threadedly engages a lens holder shaft 11, which is operatively connected to the dial 8 and disposed in parallel with the optical axis of the projecting lens 5. The lens holder shaft 11 rotates in response to the change in the magnifying power, so as to shift the lens holder 10. For instance, as the magnifying power increases, the lens holder shaft 11 rotates so as to shift the lens holder 10 toward an original 2 being copied, while as the magnifying power decreases, the lens holder shaft 11 causes the lens holder 10 to shift toward a photosensitive copying paper 6, or away from the original 2.

In order to prevent a mirror image of the original 2 from being produced on the copying paper 6, a mirror 12 is provided between the projecting lens 5 and the copying paper 6. The mirror 12 threadedly engages a mirror holder shaft 15, which is disposed in parallel with the optical axis of the projecting lens 5 and operatively connected to a dial 14 for varying the conjugate distance of the optical system of the aforesaid construction. In this embodiment, the conjugate distance corresponds to the distance from the original 2 to the photosensitive copying paper 6. As the magnifying power varies, in response to the rotation of the dial 8, the dial 14 is also turned by a suitable interconnecting means (not shown), so as to adjust the conjugate distance to a value suitable for the magnifying power thus varied.

As the magnifying power increases in excess of that corresponding to on-scale, i.e., 1 to 1 scale, and as the magnifying power decreases away from that corresponding to on scale, the dial 14 is so actuated as to force the mirror holder 13 away from the original 2, by means of the threaded engagement between mirror holder 13 and the mirror holder shaft 15 interconnected with the dial 14. Whereby, the conjugate distance is made the shortest in the case of the copying on scale, or 1 to 1 scale. In the illustrated embodiment, the positions of the lens holder 10 and the mirror holder 13 are indicated on the dials 8 and 14, respectively, by graduations representing the magnifying power.

Figure 6:
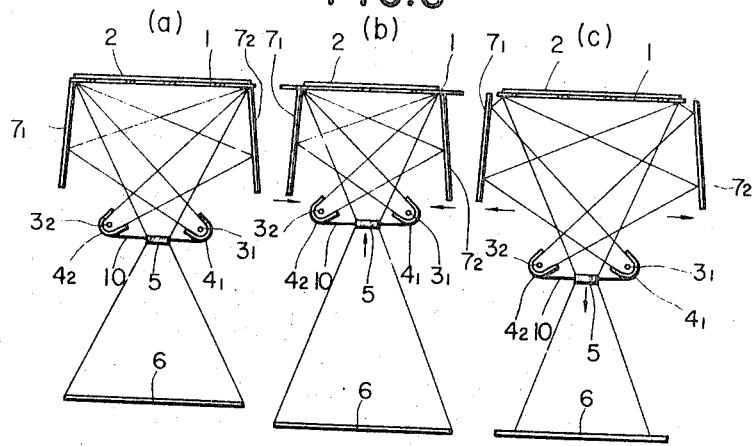
FIG. 6 includes schematic diagrams, illustrating the variation of an optical system and light beams in the device of FIG. 5 during on-scale copying, enlarged copying, and reduced copying, respectively.

The schematic diagrams (a), (b), and (c) of FIG. 6 illustrate the conditions of the optical system of FIG. 5, together with light beams paths thereof, for on-scale copying, for enlarged copying, and for reduced copying, respectively. As shown in the diagrams, the conjugate distance of the optical system is the shortest in the case of copying on-scale. For simplicity's sake, in the diagrams of FIG. 6, the mirror 12 of FIG. 5 is not shown, and the conjugate distance is shown by the straight distance between the original 2 and the photosensitive copying paper 6. In other words, the movement of the mirror 12 in FIG. 5 is represented by the movement of the copying paper 6 in FIG. 6.

The position of the planar reflectors $7_1$ and $7_2$ relative to the original-holding glass plate 1 is also changed with the magnifying power. Similarly, the position of the lens holder 10 relative to the original-holding glass plate 1 also depends on the magnifying power. Referring to the diagram (a) of FIG. 6, during the on-scale copying, the reflectors $7_1$ and $7_2$ are positioned right on the opposing edges of the glass plate 1, and the lens holder 10 is located at the center between the original 2 and the photosensitive copying paper 6. Referring to the diagram (b) of the figure, for effecting the enlarged copying the reflectors $7_1$ and $7_2$ move from the opposing edges toward the center of the glass plate 1, while the lens holder 10 approaches to the original 2, so that the light beams from the light sources $3_1$ and $3_2$ on the lens holder 10 thus raised can be directed to the reflectors $7_1$ and $7_2$ thus shifted, by means of the reflective shades $4_1$ and $4_2$, respectively. Thereby, the original 2 can be illuminated properly even when the sources $3_1$ and $3_2$ of the directed light beams are shifted toward the original 2. Referring to the diagram (c) of FIG. 6, during the reduced-scale copying, the lens holder 10 is kept somewhat farther away from the original 2, as compared with the position during the on-scale copying. At the same time, the reflectors $7_1$ and $7_2$ move away from the original-holding glass plate 1, so that the entire span of the original 2 can be illuminated uniformly by the light beams from the light sources $3_1$ and $3_2$ thus shifted.

As a result, the original 2 is illuminated by the entire light beams from the light sources $3_1$ and $3_2$, which are directed toward the reflectors $7_1$ and $7_2$ by the reflective shades $4_1$ and $4_2$, respectively. In other words, the light energy from the light source is fully used for illuminating the original without any water, regardless of the magnifying power. The mechanism for interconnecting the movement of the reflectors $7_1$ and $7_2$ to that of the lens holder 10 is known to the art. Accordingly, no detailed description of such mechanism will be made here, except that the pitches of the threads on the reflector shaft 9 and the lens holder shaft 11 are so selected as to generate properly related movements of the reflectors $7_1$, $7_2$ and the light sources $3_1$, $3_2$, together with the projecting lens 5.

In the preferred embodiment of the invention, as depicted in FIG. 6, the reflectors $7_1$ and $7_2$ have aventurine reflecting surfaces, to convert the directed light beams from the light sources into scattered light beams. Consequently, the original 2 is illuminated by both the directed light beams directly from the light sources $3_1$, $3_2$ and the scattered light beams thus converted by the reflectors $7_1$ and $7_2$. The aventurine reflecting surface can be, for instance, a glass surface with an aluminum film evaporated thereon, an aluminum plate surface with unevenly distributed reflecting powers, a roughened aluminum surface, or a white painted surface. With such reflectors $7_1$ and $7_2$ the tone of the copy may be softer than the case of using flat and smooth reflecting mirror surfaces.

In the illustrated embodiment of the present invention, one or two light sources are used together with a pair of reflectors, but the invention is not limited to such number of light sources and the reflectors. In fact, three or more such reflectors can be used together with the corresponding number of light sources. Similarly, the interconnection among the light sources, the reflectors, and the mirror is not limited to the illustrated set-up including the threaded shafts with proper pitches, but any other suitable interconnecting means can be also used. It is, of course, possible to control both the movement of the mirror and the movement of the light source and the reflecting shade, by a single control means, instead of the illustrated separate control means.

Various other modifications of the illustrated embodiment are apparent to those skilled in the art. Some examples of such modifications include swaying of the planar reflector, instead of the shifting of the reflectors in parallel with the original-holding glass plate 1; swaying of the reflecting shade toward a fixed planar reflector in response to the movement of the light source in parallel with the optical axis of the projecting lens, instead of the shifting of the reflectors; illuminating the original solely by directed light beams, instead of by the mixture of the directed and scattered light beams.

As described in the foregoing disclosure, according to the present invention, there is provided an improved illuminating device for the copying machine, which is featured in the conventionally wasted portions of light beams from a light source can be used for directly illuminating an original being copied; that the average incident angle of illuminating light beams to the original is such that the efficiency of the illumination can be improved as compared with that of known devices; and that by providing two sets of lighting combinations, each consisting of a light source, a reflecting shade, and a planar reflector, the same illuminating effects can be achieved as those obtained by using a plurality of light sources around the original. Besides, the assembly of the light source and the reflecting shade can be disposed in a compact fashion, as compared with the size of originals being copied, so that the entire size of the illuminating device can be kept small. With such a small illuminating device, a compact copying machine can be manufactured with a comparatively large number of light sources and a comparatively large original-holding glass plate, while ensuring effective cooling of the light sources, without necessitating any enlargement of the overall size of the copying machine.

Furthermore, in a preferred embodiment of the present invention, a plurality of the aforesaid lighting combination are provided, while allowing the light sources and the reflective shades to move together with the projecting lens for a copying machine in parallel with the optical axis of the projecting lens. The planar reflectors or the reflective shades of the lighting combinations are so controlled in response to the movement of the projecting lens that those light beams from the light sources, which are directed by the reflective shades, are used solely for illuminating the original. If a very small original, as compared with the size of the original-holding glass plate, is going to be copied while enlarging, conventional illuminating devices waste light energy by illuminating a much larger area than that of the small original, but the illuminating device of the present invention mitigates such waste of light energy, by fully using the light energy for illuminating only the small original. Besides, with such interconnected arrangement of the plurality of lighting combinations, uniform brightness of the image projected on the photosensitive copying paper is ensured throughout the entire image, regardless of the variation in the magnifying power, without using any separate brightness controlling means, such as a lens aperture associated with the projecting lens and a voltage regulator controlling the power source voltage of the light sources. Accordingly, the illuminating device of the invention can be used in a microchamera, with advantage.

If further improvement is desired in the uniformity of the brightness, four or more lighting combinations of the aforesaid construction can be disposed around the projecting lens and the original-holding glass plate, so as to evenly illuminate the original. Instead of using rectilinear light sources, as illustrated in FIG. 5, one or more toroidal light sources, such as circular fluorescent and stroboscopic light tubes, can be disposed around the projecting lens, in a concentric manner.

Although the present invention has been described with a certain degree of particularlity, it is to be understood that the present disclosure has been made only by way of example and that various modifications in the details of construction and the combination and arrangement of parts may be resorted to without departing from the spirit and the scope of the invention as hereinafter claimed.

What is claimed is:

1. An illumination device for a copying machine which produces an image of the entire original onto a photosensitive medium, comprising:

means including a transparent plate for holding an original thereon;

means including a lens for projecting an image of said original on the photosensitive medium;

a planar reflector located proximate each end of said transparent plate at approximately a right angle thereto and having a specular surface on its inner face;

a pair of lighting means including a pair of elongated light sources located below said transparent plate, one of said lighting means opposed to each of said planar reflectors along a light path; each said lighting means including a U-shaped reflector having on its inside face a specular surface and embracing said elongated light source so as to direct the light from said light source to said planar reflector and directly to the half area of said transparent plate opposite said light source, said planar reflector reflecting the light rays from said lighting means onto the entire surface of said transparent plate;

each of said lighting means and its corresponding planar reflector being so positioned that the symmetrical image of said lighting means relative to the plane of said planar reflector is on the outside of a plane forming an angle with said plate equal and opposite to that between said plate and the shortest line between said lens means and said plate first end, said U-shaped reflector having on its inside a first portion for permitting the light source to directly illuminate a half of the transparent plate and also intercepting the light rays emanating from said light source which would otherwise be reflected by the other half of said transparent plate to said lens, a second portion for reflecting the light rays from said light source to the whole surface of the corresponding planar reflector so that the reflected light rays are directed to the lens after being reflected by the transparent plate, and a third portion extending beyond said first portion to a point short of interrupting the light rays from the original on the transparent plate to the lens and shaped to reflect the light rays from the light source and said first portion of said U-shaped reflector to the opposite planar reflector.

2. An illumination device for a copying machine which produces an image of the entire original onto a photosensitive medium, comprising:

means including a transparent plate for holding an original thereon;

means including a lens for projecting an image of said original on the photosensitive medium;

a pair of planar reflectors arranged symmetrically with respect to the axis of said lens and each being located proximate a first end of said transparent plate at approximately a right angle thereto and having specular surface on its inner face opposing said lens means;

a pair of lighting means arranged symmetrically with respect to the axis of said lens and each including a light source located below said transparent plate and adjacent to said lens and opposed to said planar reflector along a light path, and a U-shaped reflector having on its inside face a specular surface and embracing said light source so as to direct the light from said lighting means to said planar reflector and directly to said transparent plate, said planar reflector reflecting the light rays from said lighting means onto the entire surface of said transparent plate;

each of said lighting means and respective planar reflectors being so positioned that the symmetrical image of said lighting means relative to the plane of said reflector is on the outside of a plane forming an angle with said plate equal and opposite to that between said plate and the shortest line between said lens means and said plate first end, said U-shaped reflector having a first portion for intercepting the light rays emanating from said light source which would otherwise be reflected by said transparent plate to said lens, a second portion for directing the light rays from said light source to the reflector, and a third portion extending beyond said first portion to a point short of interrupting the light rays from the original on the transparent plate to the lens and shaped to reflect the light rays from the light source and said first portion of said U-shaped reflector to the opposite planar reflector; and a mount supporting said lighting means and lens means and being movable along the axis of said lens means, and comprising means for moving said planar reflectors in opposite directions along the surface of said transparent plate in synchronism with the movement of said mount.

* * * * *